(12) United States Patent
Frauendorfer

(10) Patent No.: US 7,264,824 B1
(45) Date of Patent: Sep. 4, 2007

(54) ORAL DOSAGE FORM

(75) Inventor: Friedel Frauendorfer, Grossburgwedel (DE)

(73) Assignee: Meduna Arzneimittel GmbH, Isernhagen (DE)

( * ) Notice: Subject to any disclaimer, the term of this patent is extended or adjusted under 35 U.S.C. 154(b) by 976 days.

(21) Appl. No.: 09/719,258

(22) PCT Filed: Apr. 13, 2000

(86) PCT No.: PCT/EP00/03350

§ 371 (c)(1),
(2), (4) Date: Dec. 8, 2000

(87) PCT Pub. No.: WO01/01797

PCT Pub. Date: Jan. 11, 2001

(51) Int. Cl.
*A61K 9/48* (2006.01)
*A61K 9/66* (2006.01)
*A61K 9/64* (2006.01)
*A61K 9/56* (2006.01)
*A61K 9/60* (2006.01)

(52) U.S. Cl. .................. 424/451; 424/452; 424/455; 424/456; 424/459; 424/461; 424/463; 514/962

(58) Field of Classification Search ............... 424/400, 424/457, 451, 452, 455, 456, 459, 460, 461, 424/463; 514/962, 963, 964, 885
See application file for complete search history.

(56) References Cited

U.S. PATENT DOCUMENTS

| | | | | |
|---|---|---|---|---|
| 4,525,306 A | * | 6/1985 | Yajima | 426/93 |
| 5,422,115 A | * | 6/1995 | Horrobin | 424/422 |
| 5,686,094 A | * | 11/1997 | Acharya | 424/434 |
| 5,728,680 A | * | 3/1998 | Morozov et al. | 514/19 |

FOREIGN PATENT DOCUMENTS

| | | |
|---|---|---|
| EP | 0 369 445 | 5/1990 |
| WO | 93/13761 | 7/1993 |
| WO | 96/363297 | 11/1996 |
| WO | 97/04755 | 2/1997 |

OTHER PUBLICATIONS

Abstract—Database WPI, Sec. Ch. Week 199711, Derwent Publications Ltd. London, GB, Class B04, AN 1997-112791, XP002143507.

* cited by examiner

*Primary Examiner*—S. Gollamudi
(74) *Attorney, Agent, or Firm*—Vidas, Arrett & Steinkraus, PA

(57) ABSTRACT

Oral dosage form for food and food supplement as well as dietetics comprising polyunsaturated acids in a xylose-hardened gelatine capsule with a retarded release time.

13 Claims, No Drawings

ORAL DOSAGE FORM

The present invention relates to an oral dosage form for food, food supplement, and dietetics.

In the field of food supplement, dietetics and drugs the use of omega-3 polyunsaturated acids is known. Fish oil, linseed oil, cod-liver oil or the like is used to provide said polyunsaturated acids. It is known to supply said substances in gelatine capsules to control the unpleasant taste and to avoid flatulences. To reduce the risk of rapid oxidation and thereby the risk of enlarged toxicity, the oil is mixed with antioxidants. Rapid oxidation (becoming rancid) causes not only the development of unhealthy radicals but also reduces the durability of the products. A further problem is the risk that polyunsaturated acids are subject to undesired changes in the stomach and in the duodenum before they enter the small intestine, whereby said acids are not or only partly available in the location of resorption.

WO90/04391 discloses an oral dosage form of omega-3 polyunsaturated acids to overcome the problems of vascular diseases. It is known to supply said acids in soft gelatine capsule shells. WO96/36329 discloses to provide gelatine capsules with a coat of poly ethyl acrylate-methyl-methacrylate. The coat prevents releasing of acid from the capsule already in the stomach.

A pure gelatine capsule prevents neither the risk of changes in the structure of the polyunsaturated acids nor undesired flatulences together with its unpleasant smell.

EP 2 240 581 B1 discloses a gelatine capsule for pharmaceutical use with a controlled release of active ingredients and a process for the preparation of said gelatine capsules. During said process xylose is added to the liquid gelatine from which afterwards gelatine capsules are formed. Gelatine capsules manufactured according to the process provide retarded release of active ingredients.

The underlying problem of the invention is to provide an oral dosage form for polyunsaturated acids comprising food, food supplement, and dietetics which provides a longer durability for the polyunsaturated acids. Furthermore, the oral dosage form should be admissible under food regulations.

The problem is solved with the features of claim 1.

According to the present invention, polyunsaturated acids are provided in gelatine capsules. The gelatine capsule is hardened with the help of xylose. The hardening provides a retarded opening time of the capsule from about 45 minutes and more.

Typically fatty acids are mixed with antioxidants such as tocopherole, ascorbylpalmitate, propyl gallate and the like. The addition of antioxidants is avoided according to the invention because the xylose hardening prevents fat from "going bad". The peroxidation of the unsaturated acids is an important reaction for going bad of fat. Surprisingly, the dosage form according to the invention provides a low peroxidation, and a considerable delay in time for the fat to become rancid.

The oral dosage form according to the invention provides an undisturbed release of polyunsaturated acids in the intestine after passing the stomach. An unpleasant smell and flatulences are prevented.

Xylose is a well-known adjuvant in food industry which is inter alia re-claimable waste of the cellulose production. Xylose is also suitable as sweetening agent. Furthermore, xylose has a laxative effect.

Omega-3 polyunsaturated acids with a high content of alpha linolenic acid, preferred perilla oil, can be used as polyunsaturated fatty acids. Also the use of fish oil, linseed oil, and gamma-linolenic acid is preferred.

The dosage form according to the invention is very well suited for essential fatty acids of all kinds which are delicate to formation of toxic radicals. For the use of the dosage form the following requirements hold:
peroxide value<2,
no advanced decomposition in the stomach or in the duodenum,
resorption in the small intestine.

Surprisingly all these requirements are achieved with the dosage form according to the invention.

According to a preferred embodiment of the invention the gelatine capsule is filled with perilla oil. Perilla oil is gained from the oil-containing fruits of the Asian plant perilla fructuence. The perilla oil contains more than 70% of unsaturated fatty acids, in particular α-linolenic acid.

A plurality of scientific studies has proven positive effects for the metabolism of fat (metabolic syndrome) and an antiphlogistic effect in the intestine (Morbus Crohn). Perilla oil has furthermore the advantage of being almost without taste and smell.

Two galenic forms, a pure gelatine capsule and a xylose-hardened capsule, each containing perilla oil, have been tested for their peroxide value at 20° C. and 45% humidity for a time period of 12 months. The peroxide value of the xylose-hardened capsule was significantly lower than that of the pure gelatine capsule and did not increase during the testing period but even decreased.

In the study 24 persons took 3 to 6 capsules à 500 mg perilla oil over 4 weeks, no nausea, no stomach pressure, or other symptoms were observed. The persons' ability to taste was not reduced.

EXAMPLE 500 mg perilla oil capsule without xylose hardening during the long term test:

|  | 0 Months | 3 Months | 6 Months | 12 Months |
| --- | --- | --- | --- | --- |
| Perilla Oil/Perilla Oil mg | 498.2 | 506.2 | 513.5 | 486.1 |
| Perilla Oil/α-Linolenic Acid mg | 260 | 264.2 | 268 | 253.7 |
| Peroxide Value | 2.3 | 2.5 | 3.1 | 3 |

500 mg perilla oil capsule with xylose hardening during the long term test:

|  | 0 Months | 3 Months | 6 Months | 12 Months |
| --- | --- | --- | --- | --- |
| Perilla Oil/Perilla Oil mg | 498.7 | 508.1 | 513.8 | 489.2 |
| Perilla Oil/α-Linolenic Acid mg | 260.3 | 265.2 | 268.2 | 255.5 |
| Peroxide Value | 2.1 | 2.1 | 1.6 | 1 |

Blister packaging was used during the long term test.

Xylose hardening can be achieved according to EP 0 240 581 B1, especially according to Example 3 of the specification. In an alternative approach it is possible to uniformly spray the capsule with a solution comprising xylose, ethanol and water for a predetermined time interval. During this time the capsules are heated. After spraying a predetermined amount of hardening solution, the capsules are heat-treated for a predetermined time interval. The heat treatment causes the aldehyd function of the xylose to react with the gelatine and to provide a cross-linking. The cross-linking causes the hardening of the gelatine capsule. The finished product provides a structure which inhibits the peroxidation of fatty acids so that the addition of antioxidants is unnecessary.

The invention claimed is:

1. An oral dosage form for food, food supplements and dietetics comprising polyunsaturated fatty acids in a gelatine capsule, the gelatine capsule being xylose-hardened to an extent sufficient to inhibit peroxidation of polyunsaturated fatty acids, wherein no antioxidants are added to the polyunsaturated fatty acids.

2. The dosage form as recited in claim 1 comprising omega-3 polyunsaturated fatty acids with a high content of alpha linolenic acid.

3. The dosage form as recited in claim 1, wherein said gelatine capsule has a retarded release time of more than 45 minutes.

4. The dosage form according to claim 1, wherein said dosage form is operative against diseases of metabolism of fat and/or against intestinal inflammations.

5. The dosage form according to claim 1, wherein the gelatine capsule comprises one ingredient selected from the group consisting of fish oil, linseed oil and gamma linolenic acid.

6. A method for slowing down peroxidation of polyunsaturated fatty acids used for food, food supplement and dietetics comprising the step of utilizing a gelatine capsule, the gelatine capsule being xylose-hardened to an extent sufficient to inhibit peroxidation of polyunsaturated fatty acids.

7. The method as recited in claim 6, wherein said gelatine capsule comprises polyunsaturated fatty acids with a high content of alpha linolenic acid.

8. The method as recited in claim 7, wherein said gelatine capsule comprises perilla oil.

9. The method according to claim 6, wherein said gelatine capsule has a retarded release time of more than 45 min.

10. The method according to claim 6, wherein said gelatine capsule comprises an ingredient selected from the group consisting of fish oil, linseed oil and gamma linolenic acid.

11. The dosage form as recited in claim 1, wherein the gelatine capsule is formed by a process including spraying the capsule with xylose.

12. The dosage form as recited in claim 11, wherein the process further comprises heat treatment for a predetermined time interval.

13. The dosage form as recited in claim 12, wherein the process further comprises a reaction between the xylose and gelatine capsule to provide a cross-linking.

* * * * *